Feb. 2, 1937. O. G. RUTEMILLER ET AL 2,069,508
AUTOMATIC CONTROL FOR MACHINE TOOLS
Filed March 1, 1933 4 Sheets-Sheet 1

WITNESSES:
C. C. Leiding.
Paul E. Friedemann

INVENTORS.
Oren G. Rutemiller and
Thomas H. Long.
BY
W. R. Coley
ATTORNEY

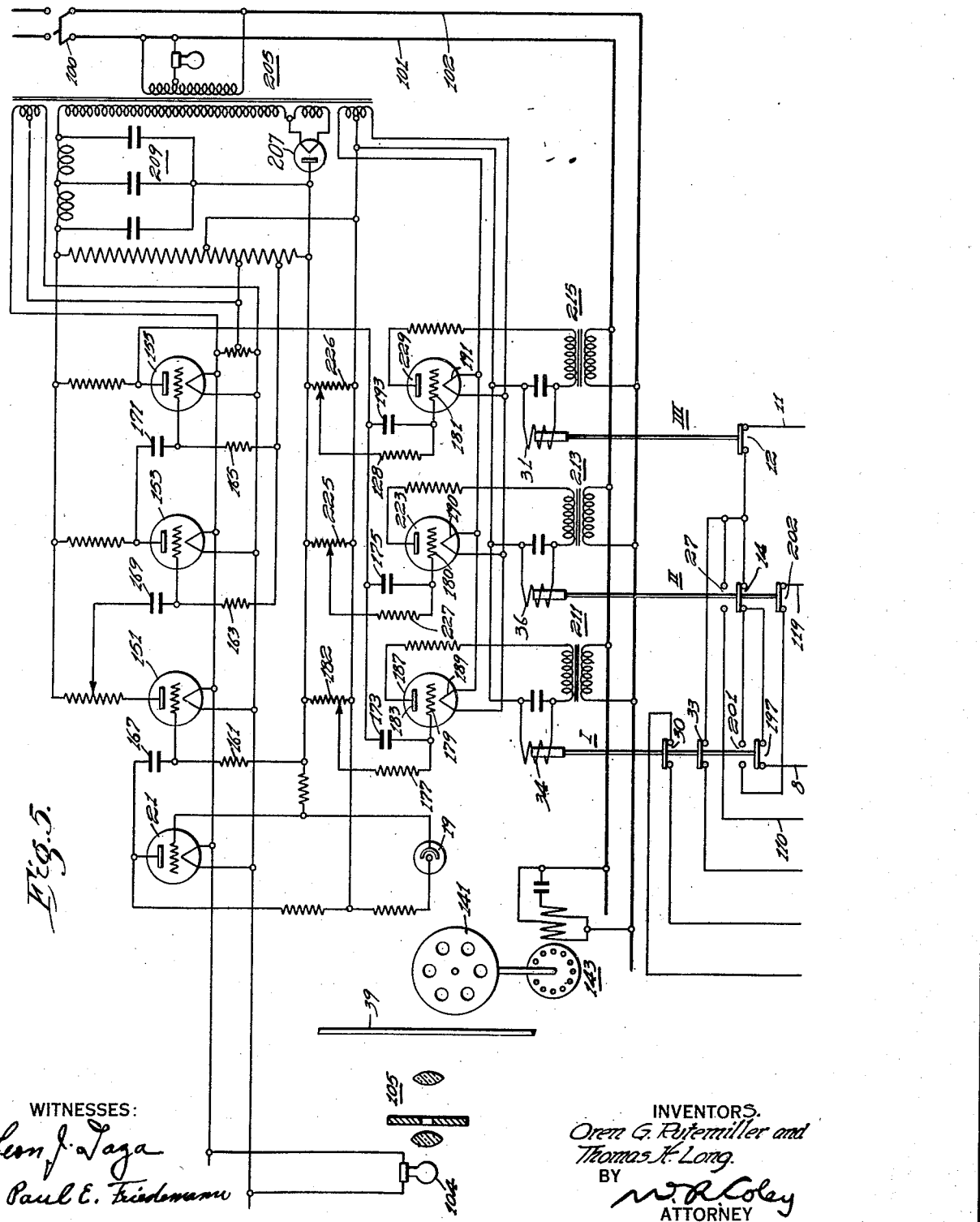

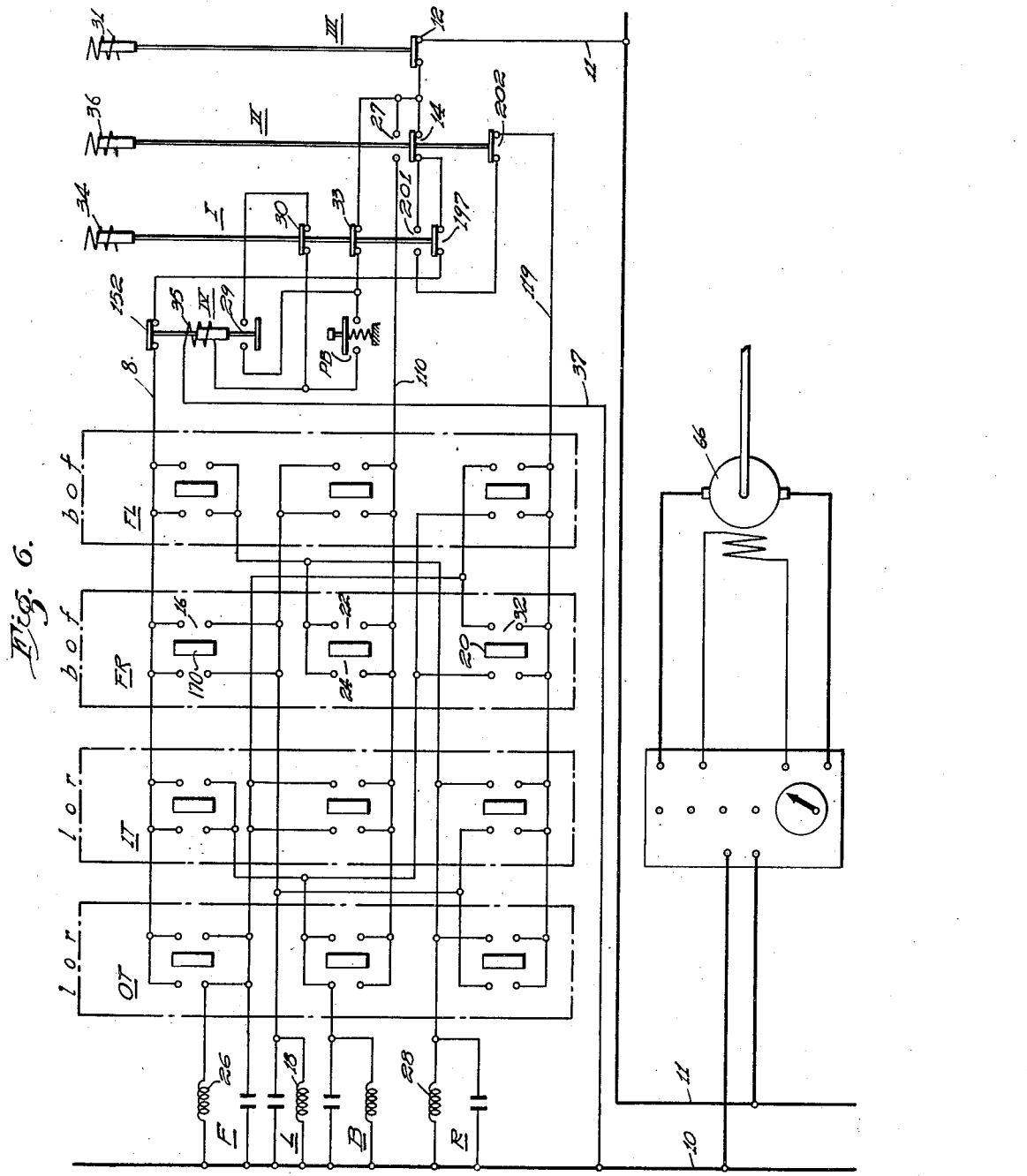

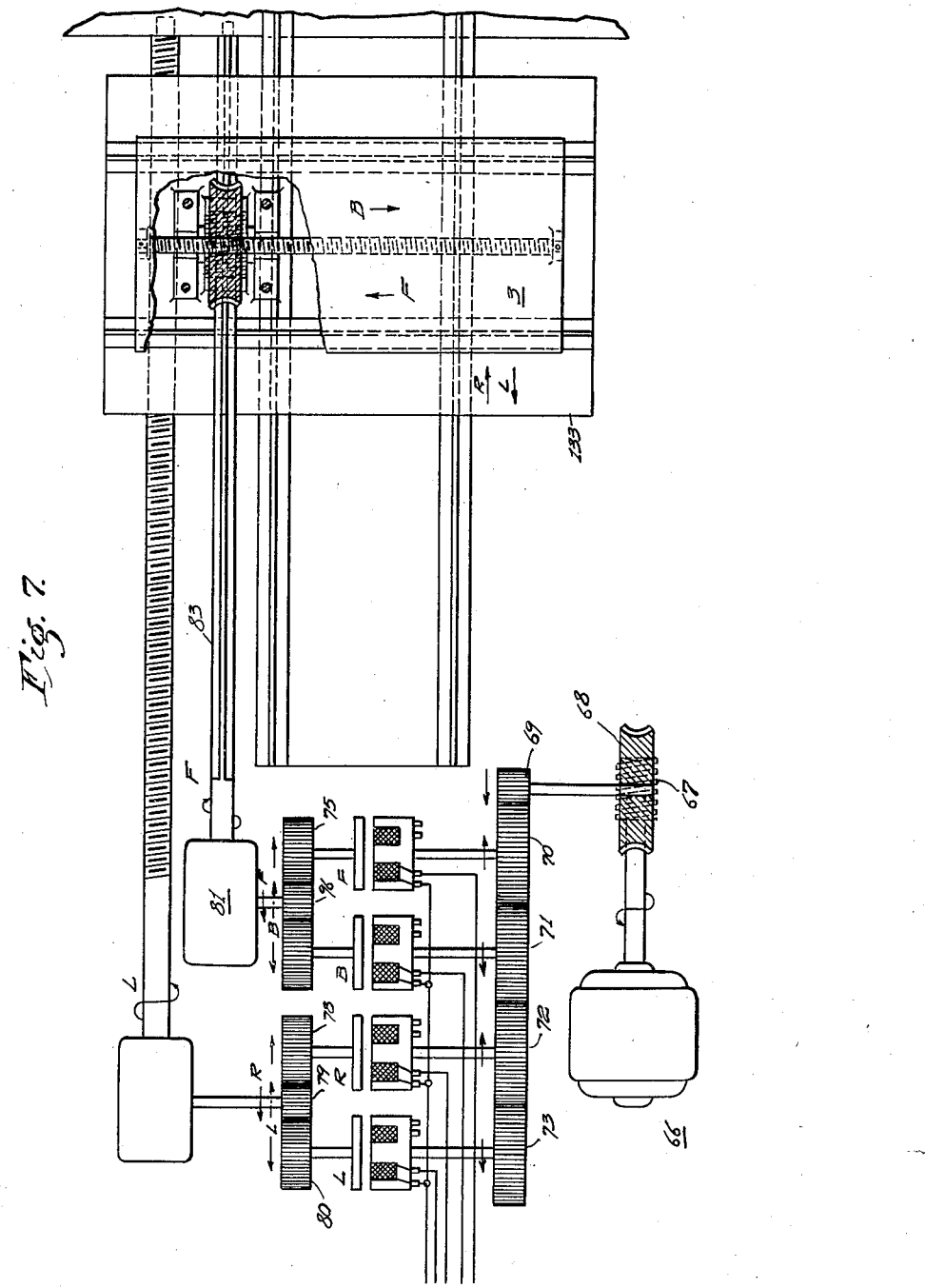

Patented Feb. 2, 1937

2,069,508

UNITED STATES PATENT OFFICE 2,069,508

AUTOMATIC CONTROL FOR MACHINE TOOLS

Oren G. Rutemiller, Wilkinsburg, and Thomas H. Long, Irwin, Pa., assignors to Westinghouse Electric & Manufacturing Company, East Pittsburgh, Pa., a corporation of Pennsylvania Application March 1, 1933, Serial No. 659,120

16 Claims. (Cl. 82—14)

This invention relates to systems of control for tools, particularly control systems utilizing photosensitive devices.

The control systems for machines automatically controlling the operation of tools constructed and operating in accordance with the teachings of the prior art, in general, include a support for a work-piece that is to be shaped in a predetermined manner, a support for a material removing tool that engages the work-piece to shape it, and a plurality of motors for moving the tool in the direction required for shaping the work-piece in the manner desired. The motors are controlled by the coaction of a template that is ordinarily shaped in a manner to correspond to the desired configuration of the work-piece and a mechanical tracer or pick-up element which cooperates with the control system of the motors and engages the template in such manner that the control system causes the motors to operate the tool in such manner that the work-piece is properly shaped.

A consideration of the systems provided in accordance with the teachings of the prior art at once discloses a number of disadvantages which are inherent in these systems. Among these, the most important involves the difficulty of suitably interconnecting the motor controls with the template through the mechanical pick-up or tracer. By reason of the difficulty encountered in this connection, the control systems are of necessity complicated and involved a large number of levers and switches with the result that the operation of the motors becomes tardy, uncertain and without accuracy.

Another matter which is ordinarily encountered in the operation of automatic machines of the prior are involves the sluggishness of operation of the mechanical tracer and the difficulty of providing a suitable tracer or pick-up and so adjusting its coaction with the template that the tool accurately and quickly follows the template in responding to the tracer.

It is, accordingly, an object of our invention to provide a system of control for an automatic machine in which the material removing tool shall accurately follow in response to the positions of the tracer coacting with a template, a pattern, or with a full sized model.

Another object of our invention is to provide a control system that shall be relatively simple in arrangement and will readily coact with the template and the machine, the operation of which it is to control.

A further object of our invention is to provide a control system utilizing an inertialess pick-up in combination with a machine for operating a tool.

It is also an object of our invention to provide a control system utilizing a tracer or pick-up means involving the coaction of radiant energy, with patterns, drawings, models, or templates, and devices responsive to radiant energy for controlling the operation of the motors operating the tools of an automatic machine.

A still further object of our invention is to provide a radiation responsive pick-up for the control system of an automatic machine.

It is also an object of our invention to provide a control system for an automatic machine of the type incorporating a pick-up element and a template cooperating therewith in which the template shall be capable of utilization as a finishing gage for work shaped in a machine.

According to our invention, we provide a control system for an automatic machine in which the pick-up element comprises a pencil of radiant energy that cooperates with the contours of a template, the indicia and drawing, or the contours of a model and a radiation responsive device to respond to the radiant energy thus modified by the template, drawing or model. To avoid the inaccuracies which might arise when the pencil of radiant energy traverses the corners and turns of the template, or model, the radiant image projected on the template is of dimensions substantially equal to the dimensions of the cutting edge of the cutting tool. Since the cutting edge of the tool normally has the contour of a circular arc, the image is also circular and is of a diameter equal to the diameter of the cutting edge of the tool. The diameter or configuration of the pencil of radiant energy, in itself, is not part of our invention.

The apparatus for producing the pencil of radiant energy utilized in the practice of our invention comprises a source of radiant energy, such as an ordinary electric light or lamp, an apertured plate which is so disposed as to be illuminated by the source, and a projecting lens which is so positioned relative to the apertured plate as to cast an image of the aperture on the template. Since it is desirable that the control system be adapted to be utilized with tools having a variety of dimensions, the arrangement is such that the image of the aperture which is projected on the template is capable of variations in dimensions. The particular optical system or devices for varying the dimensions of the image does not constitute part of our joint invention, but is being disclosed and claimed in a separate patent application of one joint inventor, Thomas H. Long, filed October 19, 1932, Serial No. 638,579, relating to Photo-electric control of machine tools.

The lamp is so mounted relative to the support provided for the apertured plate that when the aperture is mounted in any one of the positions in which it is capable of being mounted, an aperture corresponding to the particular mounting illuminated, is, therefore, imaged on the template.

That portion of the pencil of radiant energy projected across the contour of the template impinges on a sensitive element of a photo-sensitive device. A toothed disc is rotated in the path of the beam and as it rotates it produces interruptions in the beam. The interruptions thus produced result in pulsations in the output of the photo-sensitive device subjected to the portion of the beam or pencil of radiant energy not shielded off by the template and render the output of the photo-sensitive device capable of amplification by an amplifier of the alternating current type. The output of the amplifier is impressed between the control electrodes and the principal electrodes of a plurality of gas-filled electric discharge devices of the grid-controlled type, in such manner as to energize the devices in accordance with the magnitude of the output.

The electric discharge devices are so connected as to excite relays and other electromagnetic devices whereby the clutches, for coupling the driving motors to the proper gears to motivate the tool support in the desired direction, are rendered operative.

The apparatus whereby the radiant beam or pencil is produced and the photo-sensitive device are so mounted as to move with the tool support, while the template is fixed to the base of the automatic machine. When the elements are so positioned relative to the template that the template completely obstructs or shields the pencil of radiant energy, certain of the electric discharge devices are energized and others are deenergized and the particular clutch in operative relation with the motor, or motors, produces a motion of the tool support such that the tool moves normally to the work-piece, i. e. towards the work-piece. After the source of light, which moves with the tool, is displaced a distance, depending on the character of the template, and a predetermined minimum amount of radiant energy projects over the edge of the template, a different set of electric-discharge devices is energized, and a relay is excited to operate a system of clutches whereby any previous motion is caused to cease and a traversing motion, a motion across or over the surface of the work-piece, is initiated. The traversing motion continues until a certain but different amount of radiant energy is again obstructed, or the flux impinging on the photo-sensitive device is covered to a predetermined extent, in which case, the traversing motion is caused to cease and the inward or outward motion, depending on the condition of excitation of the photo-sensitive device, is initiated.

The outward motion is produced when the excitation of the photo-sensitive device is increased to a predetermined value greater than the value for which the traverse motion takes place. In such a case, a third set of electric-discharge devices becomes energized. When this third set becomes energized, a system of relays is energized to operate the necessary clutches to stop the traverse motion and initiate the outward feeding motion.

A fourth set of electric-discharge devices is provided for the purpose of stopping the machine when an excess of light impinges on the photo-sensitive device. Such a situation occurs, for example, when the template has, by some inadvertence, been removed from its proper position, in which case it is desirable that the tool and the machine be stopped.

The novel features of our invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 5 is a diagrammatic view showing a portion of the circuits comprising the system of control for the machine and showing the photo-sensitive device associated with amplifying circuits utilized in the practice of our invention;

Fig. 6 is a diagrammatic view of the portion of the system of control operating the clutches for operating the tool support, and Fig. 7 is a somewhat diagrammatic plan view of the tool moving devices, the clutches and gears, and the frame structure of the machine.

Figure 1:
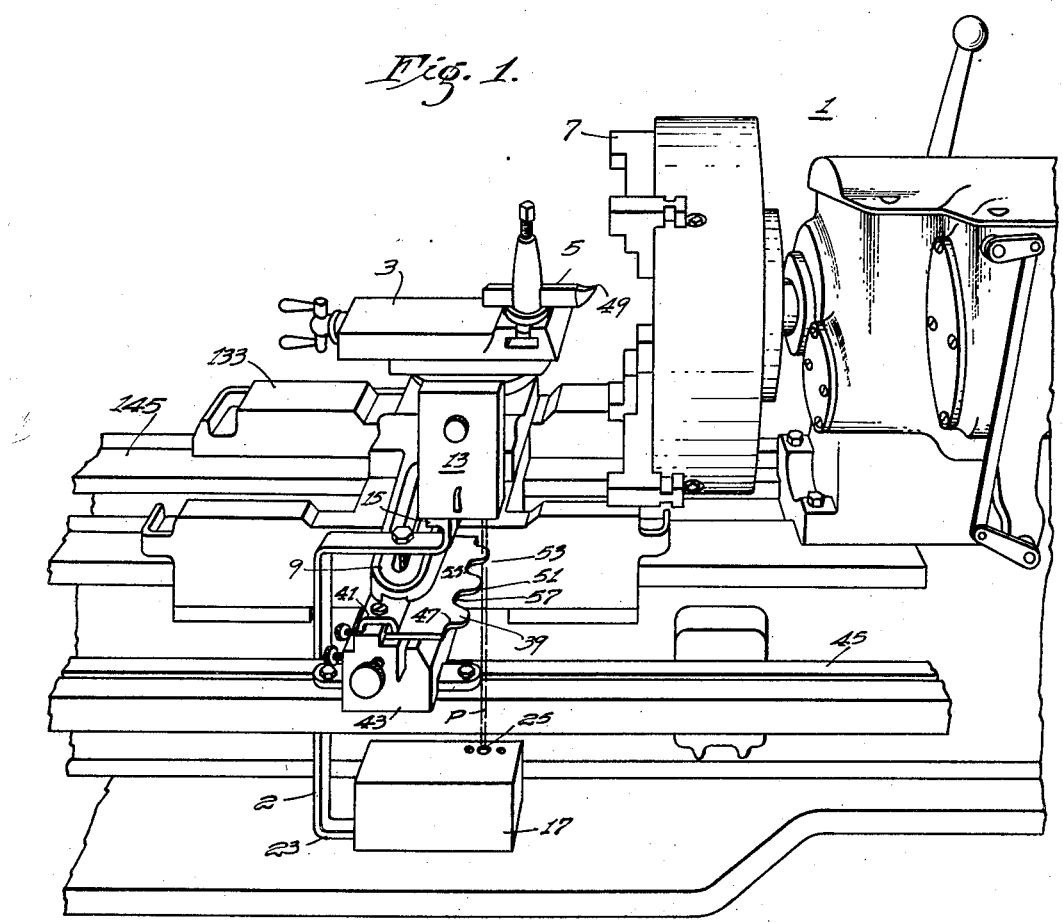
Figure 1 is a view in perspective showing the essential elements of a machine provided with our source of radiant energy and photo-sensitive device and otherwise constructed in accordance with our invention.

The apparatus shown in Fig. 1 comprises a lathe 1 incorporating the usual elements, to-wit, support 3 for a cutting tool 5 and a support 7 for a work-piece (not shown) to be shaped or operated upon in a predetermined manner. The cutting-tool support 3 is equipped with the ordinary adjustments and is motivated by a motor 66 through a system of gears and clutches, diagrammatically shown in Fig. 7.

The cutting-tool support 3 is provided with a slotted extension 9 in which a bracket 2 is adjustably secured. A container 13 having disposed therein the elements of the optical system, is secured to an upper flange 15 of the bracket 2, while a container 17, in which a photo-sensitive device 19 and certain amplifying elements are mounted, is secured on a lower flange 23 of the bracket 2. A pencil or beam of radiant energy P is projected through an opening in the container 13 of the optical system and passes through an opening 25 into the container 17 housing the radiation-sensitive system, thereby energizing the radiation sensitive device 19. (See Fig. 5.)

The output of the photo-sensitive device is suitably amplified by a system of high-vacuum devices and gas-filled electric-discharge devices and the output of the amplifier system effects the operation of relays I, II and III adapted to actuate the necessary clutches to produce the necessary motion of the tool support 3.

Fig. 7 shows the arrangement of clutches and the mechanisms for shifting the tool support 3, the showing being somewhat diagrammatic. The arrangement of Fig. 7 is a plan view of a portion appearing in Fig. 1 with the observer standing on the same side of the machine as was assumed for Fig. 1.

It will be noted that a motor 66 drives a worm 67 which, in turn, drives a worm gear 68, whereby the gears 69, 70, 71, 72 and 73 are caused to rotate in the direction indicated by the arrows adjacent these gears. If the attendant wishes to do a forward facing operation at the right, as shown in Fig. 1, in which case the tool may be caused to operate automatically toward the right or toward the left, depending on the contours of the template, then the switch or controller for facing right FR, is actuated toward the forward or *f* position thereby making it possible to normally feed the tool forward. This operation will, under certain conditions, energize the clutch F so that the gear 75 and pinion 96 are rotated in such direction that the shaft 83 through gear box 81 is caused to rotate in such direction that the tool support 3 is moved forward, i. e., away from the observer.

The control system, which will be described presently, is such that if the tool has been fed forward a sufficient amount to engage the work-piece, making a cut of the desired depth, and a certain amount of the light falling on the radiation-sensitive device 19 from the source of light 104 is intercepted, the clutch F is deenergized and either one or the other of the clutches R and L is energized to shift the tool from or toward the work-piece, as indicated by the arrows on the sub-base 133 of the tool support 3 shown in Fig. 7. By a proper selection and operation of either, the controller OT for outside turning, IT for inside turning, FR for facing right, and FL for facing left, all of the movements of the tool can be secured to produce a work-piece corresponding in contour directly to the contour of the template, or to the contour of a model if such be used.

In Fig. 6, the controllers and a portion of the control system more directly associated with the magnetic clutches and the motor 66 are illustrated. Let it be assumed that conductors 10 and 11 are suitably energized and that the attendant wishes to operate with a forward facing right operation on a work-piece disposed in the lathe. If the facing right controller FR is moved to the position *f*, that is, for a traverse motion away from the observer, a circuit is established from the conductor 11 through back contact members 12 of relay III, back contact members 14 of relay II, back contact members 197 of relay I, back contact members 152 of relay IV, conductor 8, contact members 16 bridged by the controller segment 170 and the winding 18 of the leftward feed magnetic clutch L to the energized conductor 10. It will be noted that motor 66 is suitably energized and operating at a constant speed to move the tool supports 3 and 133, respectively, as controlled by the radiations cooperating with the radiation responsive device 19 and the template utilized.

Since the magnetic clutch L is energized, the sub-base 133 of the tool support 3 will be moved in such a direction that the tool moves toward the left or away from the work-piece. As soon as the tool has moved away from the work-piece by an amount sufficient to decrease the amount of radiation falling on the radiation responsive device 19 to a predetermined amount, relay I will be energized in a manner described more in detail hereinafter and in consequence a circuit will be established from the energized conductor 11 through the contact members 12, 14, 201 and 202, conductor 119, contact members 32 bridged by the controller segment 20 to the coil 26 of the magnetic clutch F. At the same time, it will be noted that the energization of coil 18 is discontinued by the interruption of the circuit for that coil at the contact members 197. The tool will thus be moved forward and if the contour of the template or model is such that a predetermined other selected amount of radiation again falls on the radiation responsive device 19, relay I will be deenergized and as a result magnetic clutch L will again be energized.

If the contour of the template or model is such that a predetermined amount of radiation greater than that for which relay I is energized falls on the radiation responsive device 19, relay II is energized with the result that clutch F or clutch L whichever clutch may then be operating, is deenergized by the interruption of the circuits which contact members 14 established and a circuit is established from the energized conductor 11 through contact members 12 and 27, conductor 110, contact members 22 bridged by the controller segment 24, coil 28 of the magnetic clutch R for moving the tool toward the right. From the foregoing discussion, it is obvious that if the controller FR is actuated towards the right, the tool may be caused to traverse in a forward direction, that is, conduct a forward right facing operation, and move toward the right or left depending upon the contour of the template. If the controller FR be moved towards the left, the operation will still be facing operation at the right but the tool will traverse backward or toward the observer and move toward the right or left depending upon the contour of the template.

All of the necessary movements that may arise on a lathe can be accomplished by a proper selection of the controllers. If, for instance, the controller OT, outside turning, be moved towards the right, the tool will traverse over the work-piece toward the right and will move forward, and backward, depending upon the contour of the template. The controller IT, inside turning, may be utilized to cause the tool to traverse either towards the right or towards the left depending upon the position to which it is moved, while the clutches F and B will control the forward or backward movement of the tool; whereas the controller FL facing left may be utilized when facing on the left with the tool traversing either forward or backward, depending upon the direction of operation, whereas the clutches R and L determine the movement toward the right or towards the left, as controlled by the contour of the template.

It is obvious that any given template may have great variations in contour and that no tool can be expected to make the complete roughing cut by one traverse motion. To accomplish the proper operation without loss of the automatic control, the push button switch PB is provided whereby the relay IV may be energized so that regardless of the controller selected, the contact members 152 a e opened whereas the contact members 29 are closed so that relay IV holds itself in by the shunt circuit through contact members 29 and the contact members 30 of relay I. It is thus obvious, if we assumed the operation heretofore described for facing right, that is, a traverse operation in a forward direction and with relay IV energized after a satisfactory depth of cut has been reached, the tool will not be fed toward the right nor toward the left as long as the radiations intercepted by the template are a selected value. The tool is thus moved over the surface of the work-piece forwardly and continues to do so until a portion of the template is encountered by the radiations to cause the operation of relay I. With the operation of relay I, the circuit for the relay IV is broken at the contact members 30 and automatic operation is immediately resumed. The attendant can, therefore, effectively regulate the work by operating the push button switch PB when he realizes that automatic operation would mean a depth of cut too deep for safety of the machine. The circuit for the relay IV may be traced from the energized conductor 11 through contact members 12, 33, push button PB, coil 35 and conductor 37 to the energized conductor 10.

If, for any reason, the amount of light that is not intercepted by the template increases to an excessive amount, the coil 31 of the relay III is energized thereby opening contact members 12 to thus deenergize all of the clutches and thus prevent movement of the tool. This is, of course, desirable where the beam of light or other radiations that may be used to the end of the template and thus run off the template. The attendant, therefore, may again position the tool and make another cut or the finishing cut, if desired, to finish the article.

It should be noted that the thermionic device 229, by the manner of connection with the remainder of the circuits shown in Fig. 5, and the relay III it controls protects the machine in case of failure of either tube 187 or 223. Further, the relay III stops the operation of the feeding of the tool in any direction at a point where the control is to be changed from, say, facing to outside turning.

The relay II also provides protection for the machine. When relay II is energized, contact members 14 are open and no two clutches can thus be energized at the same time.

It is to be noted that, since the containers 13 and 17 for the optical system and for the photo-sensitive system are both secured to the tool support 3, they are movable therewith and follow the motion of the tool.

A template 39 of a structure corresponding to the shape of the work-piece that is desired, is secured to the frame of the machine by means of a clamp 41 which is mounted on a vise 43 which, in turn, is slidably supported in a track 45 secured to the lathe 1 and is thus capable of proper positioning on the lathe. When properly positioned, the template 39 is so oriented that its edge 47, which is so cut as to correspond to the desired final configuration of the work-piece, intercepts or partially intercepts the beam of radiant energy projected from the container 13. The movement of the tool support 3 and, therefore, of the tool 1, is predetermined by the extent to which the beam of light is intercepted by the edge 47 of the template 39. The beam of light is movable relative to the template 39 and it is, therefore, capable of tracing out in space a cylinder corresponding to the edge 47 of the template 39. The interaction between the beam of radiation P, the photo-sensitive device and the template 39 is such that substantially such a cylinder is traced. At the same time, the cutting edge 49 of the tool 5, which moves with the beam of radiations, traces a curve corresponding to the configuration of the guiding edge 47 of the template 39 and when in engagement with the work-piece shapes the latter to correspond to this configuration.

The template 39 is of such a structure that projecting portions of its controlling edge 47 correspond to the indentations to be milled or cut in the work-piece and the indentations of its controlling edge correspond to the projections in the final work-piece. This procedure is followed, since, to provide for the accurate correspondence of the manipulations of the cutting tool 5 with the movement of the light beam, for proper operations of the system, the light beam 10 should cut out the same configuration in space as the cutting tool 5 cuts out in the work-piece. It is to be noted that the template is of such structure that it may be utilized as a finish gage for the work-piece.

The movement of the light beam and its attached elements is dependent on the state of excitation of the photo-sensitive device 19 and, in accordance with the practice of our invention, the circuit associated with the photo-sensitive device 19 is so adjusted that the cutting tool 5 is moved toward the right when the beam of radiant energy is obstructed by a certain maximum amount and is moved toward the left when a given maximum amount of radiant energy impinges on the photo-sensitive device 19. On the other hand, when a predetermined amount, intermediate the amounts mentioned, is projected on the photo-sensitive device 19 the tool 5 is moved neither toward the right nor left but in a direction across the face of the work-piece.

The operation of the system can probably best be explained with reference to the central projection 51 of the template 39 shown in Fig. 1. Assume, for example, that the beam of light is obstructed a maximum amount near the forward edge of the central projection 51 and when moving transverse of the work-piece in a forward direction as assumed in previous discussions of the operation of the clutches, the beam moves in a direction away from the point of view of the observer of the drawing, i. e., forward. The tool 5 will then move in a forward direction and the beam of radiant energy will be correspondingly gradually displaced relative to the template 39 in the direction away from the observer, as stated. However, when the radiant energy is obstructed a minimum amount, the clutch L is energized since all the relays are deenergized. As soon as the necessary minimum amount of the pencil of radiant energy impinges on the photo-sensitive device 19, the control system is so actuated that the motion in the forward direction is arrested, while the motion toward the left is initiated.

As the tool is thus moved to the left, the beam of light is again obstructed by a greater amount, the necessary relays are again actuated and the motion away from the observer is resumed. This process is repeated until the tool 5 attains such a position that the beam of light is obstructed by the template at the indentation 55 of the template.

At this point, the motion toward the left is again stopped and the forward movement at right angles thereto is resumed. However, by reason of the fact that the back side of the projection 53, towards which the beam of light is now moved, slopes in a direction opposite to the forward side of projection 51 the flux falling on the photo-sensitive device 19 is decreased by the transverse or forward motion, or motion away from the observer, rather than increased. For this reason, the flux impinging on the photo-sensitive device 19 soon attains a value for which the transverse or forward motion is stopped and a motion of the tool toward the right is initiated. By reason of the movement of the pencil of radiant energy toward the right, the total flux projected on the photo-sensitive device is now increased until such a position of the beam is obtained for which the movement toward the right is arrested and the transverse or forward movement is again initiated. This process is repeated until the beam of light is obstructed by the region adjacent the outer or right-hand edge of projection 53. At this point, more and more of the radiant energy begins to impinge on the photo-sensitive device because the slope of the template is again in the direction of the bottom of an indentation. The result is that the tool moves in a corresponding manner, i. e., the radiant energy moves in small steps away from the observer and toward the left or right, depending on the slope of the edge of the template, and again, and again, away from the observer and toward the right or left. If the nature of the work-piece desired is such that reentrant cuts or other cuts need be made, the control is such that the cutting tool may be made to move as explained in the foregoing discussion, or may be made to move toward the observer and automatically to the left and right, to the left and automatically toward and away from the observer, and to the right and automatically toward and away from the observer. In any case, the path of the pick-up element is made up of a series of very short, straight lines, each straight line at right angles to the successive straight line and the whole series of straight lines tracing out a curve corresponding to the contours of the edge of the template.

To insure accurate copying of the contours of the template the image 63 that is projected on the template 39 by the beam of radiant energy is substantially identical in form to the configuration of the cutting edge 49 of the cutting tool 5. In general, the cutting edge 49 is of circular form and the image is correspondingly of circular form, the diameter of the beam being substantially equal, or at least a definite relation to the diameter of the cutting edge of the tool. This condition is necessary to eliminate difficulties which might otherwise arise in cutting corners.

Figure 2:
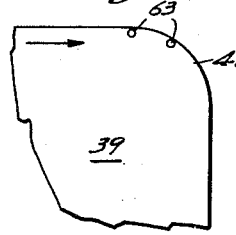
Figs. 2, 3 and 4 are diagrammatic views showing the relationship between the dimensions of the image projected on the template and the dimensions of the cutting tool.
Figure 3:
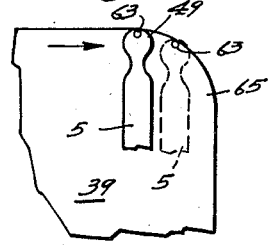
Figure 4:
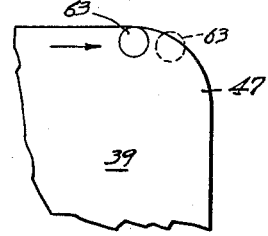

In Figs. 2, 3 and 4, the difficulties which arise in cutting a turn or corner in the work-piece are illustrated diagrammatically. In Fig. 2 a portion of the guiding edge 47 of the template 39 is shown and an image 63 of a light beam having a diameter smaller than the diameter of the cutting edge 49 of the cutting tool 5 is shown as impinging on the guiding edge 47 in two successive regions. As the light beam moves relative to the template 39 in the direction indicated by the arrow on 39 the image moves out along the curve of edge 47.

In Fig. 3 a portion 65 of the template corresponding to edge 47 is shown in its desired configuration and two positions which the tool assumes relative thereto are shown. These positions correspond to the positions of the image 63. It will be noted that the respective images 63 and the tool 5 in Figs. 2 and 3 are shown as having moved from a rectilinear position of the template adjacent to a curved portion, and that the tool projects over the desired edge of the template shown in Fig. 3. In the first of these positions the template 39 obstructs the beam a maximum amount while in the second of these positions the beam projects over the edge 65 of the template a greater amount. The direction of motion of the tool is, however, not altered until sufficient radiant energy is projected over the edge 65 of the template 39 to suitably energize the photo-sensitive device. If, therefore, the image 63 is of a smaller diameter than the cutting edge 47 of the tool 5, the contour which it will follow will correspond to the envelope of a series of tool positions represented by the tool shown in Fig. 3 and will not correspond accurately to the configuration of the template 39. A corresponding discrepancy occurs if the image 63 is of a larger diameter than the cutting edge 49 of the tool. By proper adjustment of the elements of the optical system shown at 105 the dimensions of the image of the light beam may be made to correspond to the dimensions of the cutting tool.

In Fig. 4 a section of the template 39 is shown as it appears when intersected by an image the diameter of which is equal to the diameter of the cutting edge 49 of the tool 5. As will be apparent from a comparison of Figs. 4 and 3, the movement of the tool is controlled by the periphery of the image and when the periphery of the image projects over the template 39 by a predetermined amount, the direction of motion of the cutting tool is properly adjusted. Thus, before the cutting tool can be projected to such an extent as to materially vary the configuration of the work-piece from that desired, its direction of motion is changed by reason of the fact that sufficient light is projected over the edge of the template to properly energize the photo-sensitive system. The cutting tool, therefore, accurately follows the contour of the template and the final configuration of the work-piece accurately corresponds to the contour of the determining edge of the template.

The amplifying part of our control system is shown more in detail in Fig. 5 and includes in addition to the high vacuum amplifiers 21, 151, 153 and 155 the resistors 161, 163 and 165, and the capacitors 167, 169 and 171 whereby the amplifiers are coupled to each other. The last amplifier 155 is coupled to electric discharge devices 187, 223 and 229, through capacitors 173, 175 and 193, and resistors 177, 227 and 228, and the potential variation of the anode of amplifier 155 is thus impressed between the control electrodes or grids 179, 180 and 181 and the cathodes 189, 190 and 191 of the respective devices 187, 223 and 229. When the flux impinging on the photo-sensitive device 19 attains a given value, which amount is determined by the setting of the potentiometer 182 coupled to the control electrode 179 of the discharge device 187, the device becomes energized and current is transmitted between the cathode 189 and the anode 183 thereof.

The principal circuit of the discharge device 187 is connected through the exciting coil 34 of the relay I and when this device becomes energized the relay I becomes excited and its movable contact members 197 are opened and contact members 201 are closed. By the opening of the contact members 197, the clutches controlling the operation of the motor for a feed of the tool to the right or left are rendered inoperative and by the closing of the contact members 201 the clutches controlling the motor for the receding or forward traverse movement or the approaching or backward traverse movement, as the case may be, are energized.

The system including the amplifiers is supplied with power from a transformer 205 through a rectifier 207 and a system of filters 209, but the discharge devices 187, 223 and 227 are supplied with alternating current from the transformers 211, 213, and 215. No interrupters are thus needed.

When the amount of the pencil of radiant energy impinging on the photo-sensitive device 19 becomes greater by a predetermined amount over the minimum value for which the discharge device 187 become energized, the electric discharge device 223 becomes energized. The amount of radiant energy for which the device 223 becomes energized is regulated by the setting of the second potentiometer 225, which is similar to the potentiometer 182. The operation of the device 223 is similar to the operation of the device 187. When the device 223 becomes energized the relay II is operated and the necessary clutch for producing a movement of the tool to the right and left is rendered operative, while the clutch for producing the receding or approaching traverse motion of the tool 5 is rendered inoperative.

A third device 229 similar to the first two devices 187 and 223 is provided for the purpose of stopping the machine when the excitation of the photo-sensitive device 19 is greater, by a predetermined amount, than the excitation necessary for energizing the second electric-discharge device 223. The third device 229 is provided for stopping the machine 1 in contingencies, or when the tool support is in such a position that the beam of light has just passed over a terminal of the determining edge 47 of the template 39 at which point the control should be changed. The exciting coil 31 of the relay III whereby all the circuits are opened is connected to the principal circuit of the third device 229.

A better understanding can be had through an explanation of the operation of the relay system shown in Fig. 5. When the template 39 and optical system are so disposed relative to each other that the photo-sensitive device 19 is energized a minimum, the controlling relays are in the positions shown in Fig. 5 and the tool 5 is being fed toward the left if the switch or controller for facing right, FR, is actuated. When the flux impinging on the photo-sensitive device 19 is of such a magnitude that the first device 187 is energized, the relay I is energized and the leftward movement of the tool is arrested while the traverse movement in the direction originally selected is initiated. When the amount of energy impinging on the photo-sensitive device 19 is such that both the first and the second discharge devices, i. e., 187 and 223, are energized, the corresponding relays I and II are energized and the traverse feed is stopped while the feed toward the right is initiated. When the amount of energy impinging on the device 19 is such that the third discharge device, i. e., 229, is energized, the movement of the tool is entirely stopped.

While a more or less detailed discussion has been given of the control circuits appearing in Fig. 5, attention is called to the fact that the radiation responsive device is disposed to receive energy from the source of light 4, which source of light is caused to throw a pencil of rays through the optical system 105 on the template 39 and through a splitter or light interrupter 141 to the device 19. The light interrupter 141 is driven by a motor 143 operating at substantially constant speed from lines 101 and 102 connected to a suitable source of alternating current by the switch 109. The control circuits embodying the amplifier tubes 21, 151, 153 and 155 are energized by direct current from the transformer 205 by means of the rectifier 207, but the electric discharge devices 187, 223 and 229 are energized directly by alternating current through the transformers 211, 213 and 215. The potentiometers 182, 225 and 226 coupled with the resistors 177, 227, 228 and capacitors 173, 175 and 193 provide coils 34, 36 and 31 of relays I, II, III, respectively, with energy when given amounts of radiation are received by the radiation responsive device 19.

The foregoing description of our invention is thought to be illustrative and those skilled in the art, after having had the benefit of the teachings embodied in this disclosure, might devise other circuit diagrams for accomplishing substantially the results and advantages heretofore discussed. However, we do not wish to be limited to the specific mechanical arrangement nor control circuits herein disclosed but wish only to be limited by the scope of the claims hereto appended as construed in the light of pertinent prior art.

We claim as our invention:

1. In a control system for a machine of the type described, including means for supporting a work piece and means for supporting a cutting tool to engage said work piece to shape it; a templet corresponding to the desired configuration of said work piece and means for projecting a beam of radiant energy on said templet, said radiant energy projecting means comprising a source of radiant energy, a housing, an aperture therein, means for interrupting the radiant energy emitted from said aperture, means responsive to said radiant energy and means for varying the position of both said means responsive to the radiant energy and the source of radiant energy and said aperture to cooperate with said templet to control the position of the cutting edge of said tool.

2. In a control system for a machine of the type described including means for supporting a work piece and means for supporting a cutting tool to engage said work piece to shape it; a model for said work piece, means for projecting a beam of radiant energy on said model, said radiant energy projecting means comprising an aperture, means for illuminating the aperture, means for intermittently interrupting the radiant energy emitted from said aperture and electrical control means responsive to the position of said radiant energy with reference to the model for controlling the cutting tool to shape said work piece to correspond in shape to said model.

3. In a control system for a machine of the type described including means for supporting a work piece and means for supporting a cutting tool to engage said work piece to shape it; a templet corresponding to the desired shape of said work piece, means for projecting a beam of radiant energy on said templet, means for projecting an image of said illuminated aperture on said templet and means for so orienting said aperture relative to said illuminating means and said projecting means that the aperture illuminated on said templet corresponds to the dimensions of the cutting edge of said tool and electrical control means for controlling the position of the tool in response to the position of the radiant energy with reference to the templet.

4. In a control system for a machine of the type described which includes means for supporting a work piece to be shaped and means for supporting a cutting tool for engaging said work piece to shape it; and means for motivating said tool supporting means; a model, a contour of which corresponds to the desired shape of said work piece, means for projecting a beam of radiant energy on said model, means to respond to the resultant radiant energy emitted by said templet when said radiant energy is of a total flux greater than a predetermined value for energizing said motivating means to move said tool supporting means in a predetermined direction and additional means to respond to the resultant radiant energy emitted past said model when said radiant energy is of a total flux less than a predetermined value for energizing said motivating means to move said tool support means in another direction.

5. In a control system for a machine of the type including means for supporting a work piece to be shaped, means for supporting a tool for engaging said work piece to shape it and means for motivating said tool supporting means; a model of said work piece, means for projecting a beam of radiant energy on said model, means to respond to the resultant radiant energy emitted by said model when said radiant energy is of a predetermined total flux to energize said motivating means to move said supporting means parallel to said work piece, means to respond to the resultant radiant energy emitted by said model when said radiant energy is of a total flux greater than said predetermined flux for energizing said motivating means to move said tool supporting means in a direction normal to said work piece and means to respond to the radiant energy emitted by said model, when it is of a total flux less than said predetermined flux for energizing said motivating means to move said tool-supporting means in a direction normal to said work piece and in a sense opposite to the sense in which it is moved when said total radiant flux is greater than said predetermined value.

6. In a system of control for a machine of the type including means for supporting a work piece to be shaped, means for supporting a cutting tool for engaging the work piece to shape it and operating means for moving said tool supporting means; a pattern the contours of which correspond to the desired shape of the work piece, means for projecting a beam of radiant energy on said pattern, means responsive to a certain modification of said radiant energy by said pattern for effecting the movement of said tool supporting means in a given direction with reference to said work piece, means responsive to a certain other modification of said radiant energy by said pattern for effecting the movement of said supporting means in a direction at right angles to said first given direction of movement of the tool supporting means, and means responsive to a certain third modification of said radiant energy by said pattern for effecting the movement of said tool supporting means in a given direction at right angles to said first given direction but in an opposite sense to said second movement at right angles to said first given direction.

7. In a system of control for a machine of the type including means for supporting a work piece to be shaped, means for supporting a cutting tool for engaging the work piece to shape it and operating means for moving said tool supporting means; a pattern the contours of which correspond to the desired shape of the work piece, means for projecting a beam of radiant energy on said pattern, means responsive to a certain modification of said radiant energy by said pattern for effecting the movement of said tool supporting means in a given direction with reference to said work piece, means responsive to a certain other modification of said radiant energy by said pattern for effecting the movement of said supporting means in a direction at right angles to said first given direction of movement of the tool supporting means, means responsive to a certain third modification of said radiant energy by said pattern for effecting the movement of said tool supporting means in a given direction at right angles to said first given direction but in an opposite sense to said second movement at right angles to said first given direction and stopping said tool operating means when the modification of said radiant energy by said pattern is a predetermined amount.

8. In a control system for a machine of the type including means for supporting a work piece to be shaped, means for supporting a cutting tool to engage said work piece to shape it and operating means for moving said tool supporting means; a pattern the contours of which correspond to the desired shape of the work piece, means for projecting a beam of radiant energy on said templet, means responsive to certain modifications of said radiations effected by said pattern, and including electro-discharge devices for causing said tool supporting means to move in a given traverse direction, and additional means, also including electric-discharge devices, responsive to certain other modifications of said radiations by said pattern for causing said tool support to move either in one direction or in another direction at right angles to said first traverse direction.

9. In a control system for a machine of the type including means for supporting a work piece to be shaped, means for supporting a cutting tool to engage said work piece to shape it and operating means for moving said tool supporting means; a pattern the contours of which correspond to the desired shape of the work piece, means for projecting a beam of radiant energy on said templet, means responsive to certain modifications of said radiations effected by said pattern, and including electric-discharge devices, for causing said tool supporting means to move in a given traverse direction, additional means, also including electric-discharge devices, responsive to certain other modifications of said radiations by said pattern for causing said tool support to move either in one direction or in another direction at right angles to said first traverse direction, and means, including electric-discharge devices, for stopping the movement of said tool support when the modifications of said radiations by said pattern are a certain amount.

10. In an automatic machine of the type including a work piece to be shaped, a cutting tool, a support for the tool, means moving said support in all directions in a given plane, a finish gauge complementary in contour to the desired shape of the work piece and thus adapted to gauge the accuracy of finish of said work piece and means cooperating with said finish gauge as a pattern for controlling the motion of the tool support thereby to provide for the proper shaping of said work piece.

11. In an automatic machine of the type including means for supporting a work piece to be shaped, a cutting tool, a support therefor designed to be movable in all directions in any selected plane of operation, a finish gauge adapted to gauge the accuracy of finish of said work piece and means, including a source of radiant energy, electric-discharge devices and control circuits, cooperating with said gauge as a pattern for controlling the motion of said tool support thereby to properly shape the work piece.

12. In a control system for a machine for duplicating objects, said machine having a cutting tool, a support for the tool, a support for the work piece, and means for moving the tool support relative the work piece in all directions in a given selected plane of operation, in combination, a source of radiant energy, a support for an object to be duplicated, means for subjecting the object to be duplicated to a pencil of radiant energy, radiation responsive means disposed to be subject to the modifications of the pencil of radiant energy by said object, and electric-discharge devices controlled by the radiation responsive device for selectively controlling the tool support to effect the duplication of said object.

13. In a control system for a machine of the type including means for supporting a work piece to be shaped, means for supporting a tool for engaging said work piece to shape it and means for motivating said tool supporting means; a template, a contour of which corresponds to the desired shape of said work piece, means for projecting a beam of radiant energy on said template, means to respond to the resultant radiant energy emitted by said template when said radiant energy is of a total flux greater than a predetermined value for energizing said motivating means to move said tool supporting means in a predetermined direction and additional means to respond to the resultant radiant energy emitted by said template when said radiant energy is of a total flux less than a predetermined value for energizing said motivating means to move said tool-supporting means in another direction.

14. In a control system for a machine of the type including means for supporting a work piece to be shaped, means for supporting a tool for energizing said work piece to shape it and means for motivating said tool supporting means; a template, a contour of which corresponds to the desired shape of said work piece, means for projecting a beam of radiant energy on said template, means to respond to the resultant radiant energy emitted by said template when said radiant energy is of a predetermined total flux to energize said motivating means to move said supporting means parallel to said work piece, means to respond to the resultant radiant energy emitted by said template when said radiant energy is of a total flux greater than said predetermined flux for energizing said motivating means to move said tool supporting means in a direction normal to said work piece and means to respond to the radiant energy emitted by said template when it is of a total flux less than said predetermined flux for energizing said motivating means to move said tool-supporting means in a direction normal to said work piece and in a sense opposite to the sense in which it is moved when said total radiant flux is greater than said predetermined value.

15. In a control system for a machine of the type including means for supporting a work piece to be shaped, means for supporting a tool for engaging said work piece to shape it and means for motivating said tool supporting means; a template, a contour of which corresponds to the desired shape of said work piece, means for projecting a beam of radiant energy on said template, means to respond to the resultant radiant energy emitted by said template when said radiant energy is of a predetermined total flux to energize said motivating means to move said supporting means parallel to said work piece, means to respond to the resultant radiant energy emitted by said templates when said radiant energy is of a total flux greater than said predetermined flux for energizing said motivating means to move said tool supporting means in a direction normal to said work piece and means to respond to the radiant energy emitted by said template when it is of a total flux less than said predetermined flux for energizing said motivating means to move said tool-supporting means in a direction normal to said work piece and in a sense opposite to the sense in which it is moved when said total radiant flux is greater than said predetermined value and means for deenergizing said motivating means when the radiant flux emitted by said template is a predetermined value greater than any value of the flux for which the motivating means is energized to move said tool-supporting means normal to said work piece.

16. In a control system for a machine of the type including means for supporting a work piece to be shaped, means for supporting a tool to engage said work piece to shape it and means for motivating said tool-supporting means; a template, a contour of which corresponds to the desired shape of said work piece, means for projecting a beam of radiant energy on said template, means to respond to the radiations emitted by said template and including a normally deenergized electric-discharge device and means for energizing said device, when the radiant flux emitted by said template attains a predetermined value, to energize said motivating means to move said tool-supporting means in one direction and additional means to respond to the radiations emitted by said template and including another normally deenergized electric-discharge device and means for energizing said device when the radiations emitted by said template attains a value greater than said predetermined value to energize said motivating means to move said tool-supporting means in another direction.

OREN G. RUTEMILLER.
THOMAS H. LONG.